May 19, 1970 — M. MADARASZ ET AL — 3,512,375
FLEXIBLE COUPLING FOR SHAFTS
Filed Nov. 27, 1968 — 2 Sheets-Sheet 1
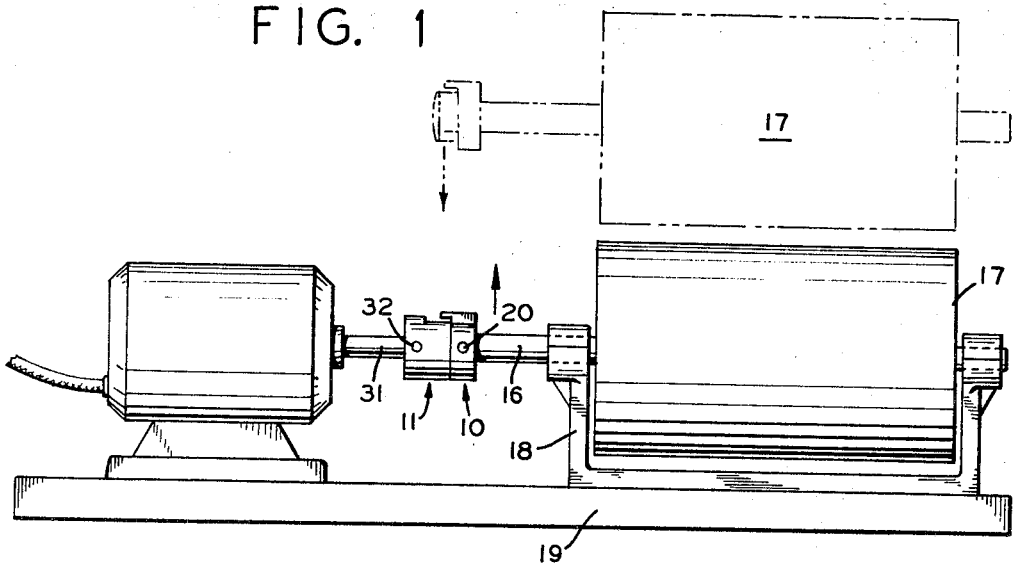
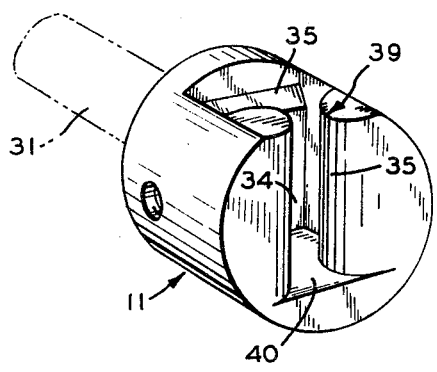
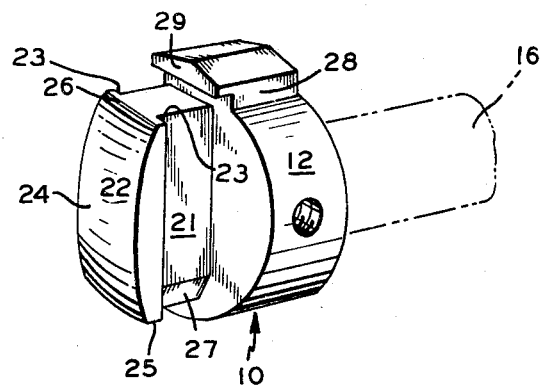
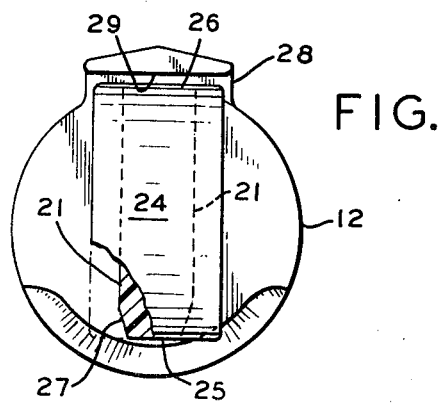
INVENTORS.
MIKLOS MADARASZ
ALFRED R. BAIO
BY: JOHN P. CHANDLER
THEIR ATTORNEY.

May 19, 1970  M. MADARASZ ET AL  3,512,375

FLEXIBLE COUPLING FOR SHAFTS

Filed Nov. 27, 1968  2 Sheets-Sheet 2

INVENTORS.
MIKLOS MADARASZ
ALFRED R. BAIO
BY: JOHN P. CHANDLER
THEIR ATTORNEY.

United States Patent Office 3,512,375
Patented May 19, 1970

3,512,375
FLEXIBLE COUPLING FOR SHAFTS
Miklos Madarasz and Alfred R. Baio, New Rochelle, N.Y., assignors to Sealectro Corporation, Mamaroneck, N.Y., a corporation of New York
Filed Nov. 27, 1968, Ser. No. 779,405
Int. Cl. F16d *3/16*
U.S. Cl. 64—7                 8 Claims

ABSTRACT OF THE DISCLOSURE

A two part coupling having portions for attachment to a driven and a drive shaft and comprising a male part and a female part, the male part having a T-shaped extension with flat, vertical faces and a terminal section forming the head of the T with portions extending laterally of the driven faces, the female part having a blind radial slot extending to the outer end of said female part to receive said T-shaped extension, the slot being of sufficient size to receive said extension when it is moved radially downwardly into the slot.

---

This invention relates to flexible couplings for connecting, in driving relation, driving and driven shafts, and has for its principal objects the provision of a two part coupling for shafts wherein the element of backlash is completely eliminated and wherein the portion carried by the driven element can be quickly disconnected from and reconnected with the part carried by the drive shaft without any loss of angular relationship between the elements. The act of disconnecting is accomplished by moving the driven element in a direction perpendicular to the axis.

Another object of the invention is to provide an easily detachable, two part coupling which allows a considerable measure of flexibility between the parts, including angular misalignment, between the axes and this angular misalignment can be present without causing any backlash. In other words, despite misalignment between the shafts, the slightest rotative force of the driven shaft in either direction is imparted to the driven shaft.

In the drawings:

FIG. 1 is a side elevation showing a typical installation of the present two part coupling in connection with a motor and a programming drum, both mounted on a common base, the driving part of the present coupling being mounted on the motor shaft and the driven part on the drum shaft;

FIG. 2 is a perspective view showing the end of the drive part of the coupling;

FIG. 3 is a similar view of the driven part;

FIG. 9 is a section on line 9—9 of FIG. 6 and showing an end elevation of the driven part.

Figure 4:
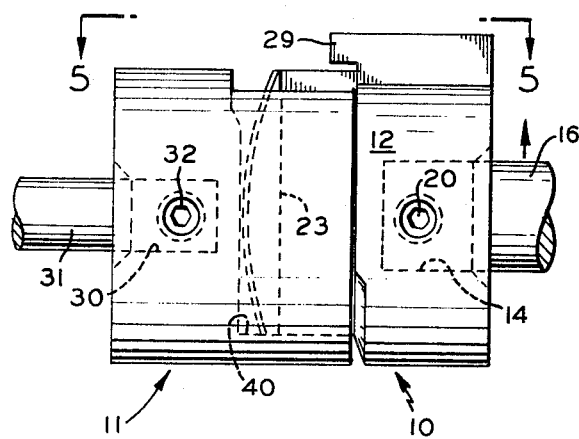
FIG. 4 is a side elevation of the assembly coupling shown in FIG. 1.

The coupling includes a driven part 10 (FIG. 3) and a drive part 11 (FIG. 2) both of which are preferably molded or cast from plastic insulating material. The driven part has at one end a cylindrical section 12 with an axial opening 14 to receive the driven shaft 16. A drum 17 is keyed to this shaft, the latter being journalled in a frame 18 mounted on a base 19. The cylindrical portion 12 has a threaded radial hole to receive a set screw 20.

Figure 5:
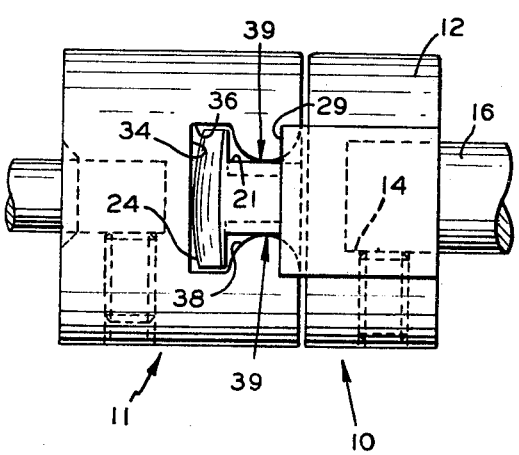
FIG. 5 is a similar view with the parts having rotated 90°.
Figure 6:
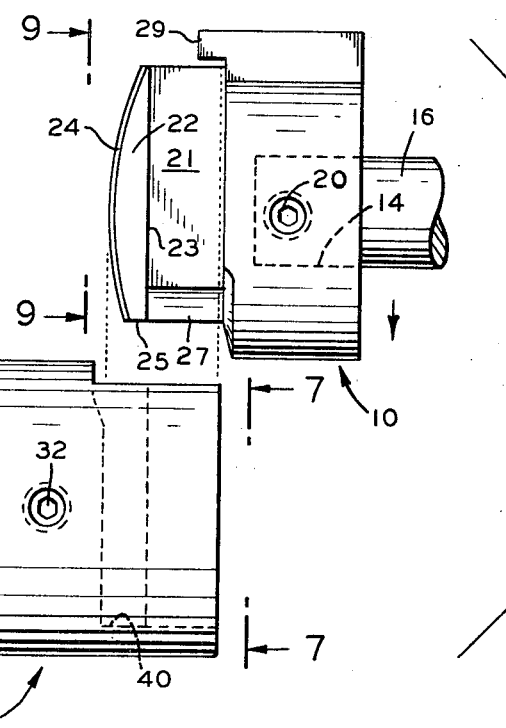
FIG. 6 is an exploded view of the parts shown in FIG. 4 with the driven part having been raised from the driving part to disconnect the coupling.
Figure 7:
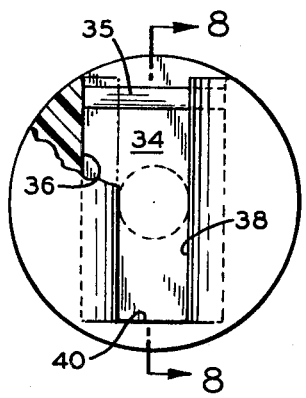
FIG. 7 is a partial section in lines 7—7 of FIG. 6.
Figure 8:
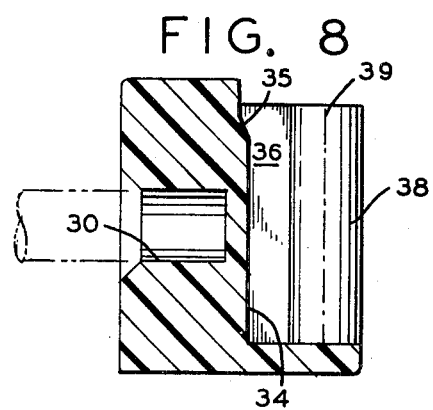
FIG. 8 is a section in line 8—8 of FIG. 7.

The driven part is formed with a generally T-shaped axial extension which has, first, a generally rectangular portion with opposed vertical faces 21 whose lower edges are bevelled at 27 (FIG. 3) and, second, a transverse terminal portion 22 forming the head of the T. On its inner surface, this terminal portion has narrow rectangular vertical faces 23 lying at about right angles to vertical faces 21 and on its outer side it has a convexly curved face 24 whose lower edge 25 has greater thickness than its upper edge 26. This face 24 is convexly curved from top to bottom and it is also convexly curved from side to side as clearly shown in FIG. 5. By forming the head of the T with this contour it acts as a pilot to guide the T-shaped driven section into the radial recess in the drive part. It also permits some misalignment of the shafts without permitting any backlash.

In order to prevent the possibility of the upper end 26 of the T head from entering the radial slot in the drive part, the cylindrical section 12 has a radial extension 28 with an overhang 29 forming a barrier, should the driven part 10 be inverted from the FIG. 3 position.

The driving part is of cylindrical shape and is formed at its inner end with an axial bore 30 for motor shaft 31 and a threaded radial hole for a set screw 32 to secure the coupling section on the shaft. At its outer end, there is formed a blind radial recess defined at its inner end by a flat wall 34 with an entrant bevel 35, two opposed right angular walls 36, thus forming a recess that extends clear to the end wall. So long as the two shafts 31 and 16 are in perfect axial alignment, the actual driving is done along lines 39 representing the innermost surfaces of section 38. These broken lines 39 are spaced apart a distance such as to have a snug fit with the opposed driven faces 21 of part 10. These broken lines are indicated as points in FIGS. 2 and 5. This snug fit between the flat surfaces and the curved surfaces cause the slightest rotative movement in either direction of the driving part to be transmitted to the driven part, thus eliminating even the slightest measure of backlash. This ingenious combination of flat and curved surfaces permits a considerable measure of misalignment of the shaft to occur without binding and without any loss of the tight drive. The lower end of the radial slot defined by surfaces 34, 36 and 38 is closed as shown at 40.

It will be seen from the foregoing that the two coupling parts can be quickly disconnected by simply raising the driven shaft and the mechanism carried thereby, such as the drum, straight upwardly, as shown in FIG. 1. By virtue of the relationship of the bearings for shaft 16 at the upper end of frame 18, it is necessary to raise the shaft straight up and return it straight down as indicated by the arrows in FIG. 1. Accordingly, it is essential to stop the motor at a point where the faces 35 of the driving elements in coupling part 11 are precisely vertical. As the coupling part 10 is raised or lowered, there is no binding of the surfaces nor any obstruction to hinder either operation. There are also no screws, or latches, to unfasten and there is no loss of the parallel relation between both shafts. When the coupling parts are re-assembled, the bevelled surfaces 35 and 27 and the compound curved surfaces of the T-head 24 assure ready entry into the recess.

When the driven member, such as the drum, is frequently replaced, it is preferred to use coupling part 10 on the driven shaft and not vice versa but the coupling parts are interchangeable.

The use of the terms upper, lower, vertical, etc. as used herein and in the appended claims, is solely to obtain greater clarity and refers only to the position the parts occupy in the drawings, since it is clear that as the shaft turns, these relative positions are continuously changing.

What we claim is:

1. A quickly detachable, generally cylindrical two-part coupling having portions for attachment to aligned shafts and comprising a male part and a female part, the male part having a generally T-shaped extension with opposed, generally flat, vertical faces which normally are the driven faces, and a terminal section forming the head of the T with portions extending laterally of said faces, the female part having a slot closed at its lower end and extending clear to the outer end of said female part to receive said T-shaped extension, said slot being of sufficient size to receive said extension when the latter is moved radially downwardly into the slot, said slot having an inner end wall, opposed side walls, and two radially disposed, vertical semi-cylindrical sections at the outer end of the slot and whose central vertical portions engage the flat faces of the T-shaped extension with a snug fit to eliminate backlash between the shafts while permitting a measure of misalignment between the shafts.

2. The structure of claim 1 wherein the semi-cylindrical sections are the drive members.

3. The structure of claim 1 wherein both parts have axial openings to receive the shafts, and set screws to secure the parts of the shafts.

4. The structure of claim 1 wherein the terminal face of the T head is convexly curved from top to bottom to facilitate said misalignment to occur without causing binding.

5. The structure of claim 1 wherein the terminal face of the T head is convexly curved from side to side.

6. The structure of claim 1 wherein the lower end of the head of the T has greater thickness than the upper end.

7. The structure of claim 1 wherein the inner end of the slot in the female part has a bevelled entrant portion.

8. The structure of claim 1 wherein the lower ends of the flat vertical faces of the T-shaped extension are bevelled.

References Cited
UNITED STATES PATENTS

| | | | |
|---|---|---|---|
| 1,109,006 | 9/1914 | Neal | 64—8 |
| 1,128,432 | 2/1915 | Fetzer | 64—8 |
| 1,243,347 | 10/1917 | Schwinn | 64—7 |
| 2,348,135 | 5/1944 | Jacobi | 64—9 XR |
| 3,098,365 | 7/1963 | Pearson | 64—7 |

JAMES A. WONG, Primary Examiner